July 5, 1966  F. C. HUTTO  3,259,028
PISTON

Filed March 20, 1964  2 Sheets-Sheet 1

FRANK C. HUTTO
INVENTOR.

BY John R. Faulkner
Ernest A. Beutler
ATTORNEYS

July 5, 1966  F. C. HUTTO  3,259,028
PISTON
Filed March 20, 1964  2 Sheets-Sheet 2
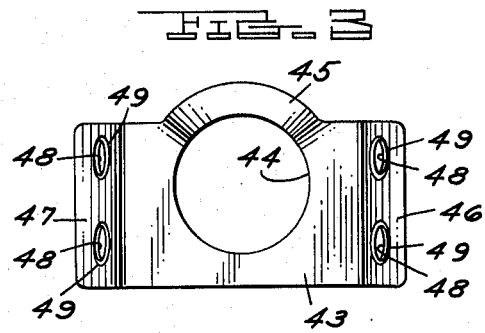
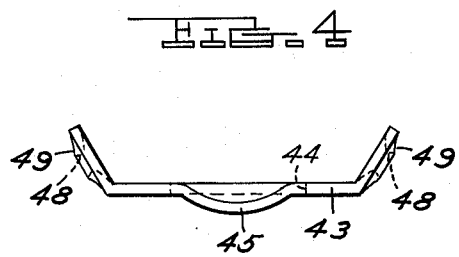
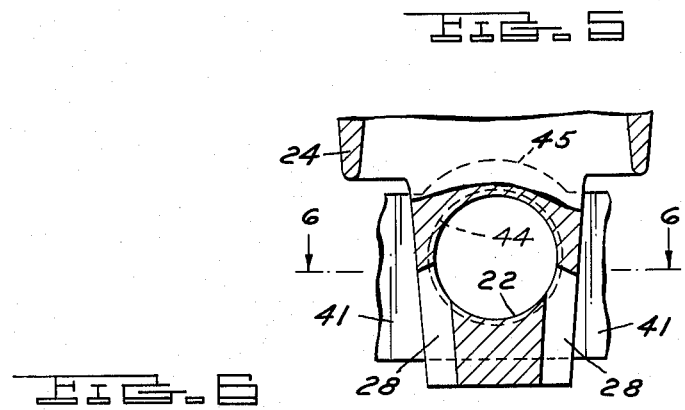
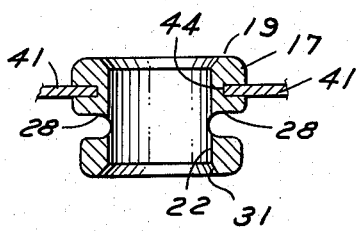
FRANK C. HUTTO
INVENTOR.
BY *John R. Faulkner*
*Ernest A. Beutler*
ATTORNEYS

United States Patent Office 3,259,028
Patented July 5, 1966

3,259,028
PISTON
Frank C. Hutto, Dearborn, Mich., assignor to Ford Motor Company, Dearborn, Mich., a corporation of Delaware
Filed Mar. 20, 1964, Ser. No. 353,384
8 Claims. (Cl. 92—228)

This invention relates to a piston for an internal combustion engine and more particularly to an improved, lightweight piston.

It is now common practice in high-speed internal combustion engines to employ pistons formed from aluminum or other similar lightweight metals or alloys. Considerable cost savings can be realized through the use of lightweight pistons since the weight of other engine parts may be reduced accordingly. For example, since the reciprocating mass is decreased the counterbalancing mass of the crankshaft also can be reduced. In addition, the decreased inertial forces exerted upon the crankshaft, crankshaft bearings, connection rods, and connection rod bearings permits simplification of these parts with attendant cost savings.

The use of lightweight metals in the fabrication of pistons, however, presents several problems. The lightweight metals commonly employed have high coefficients of thermal expansion and of thermal conductivity. The cylinders in which the pistons reciprocate are generally formed from cast iron, which has a lower coefficient of thermal expansion, and the piston and the cylinder bore expand unequally. Since the piston diameter grows more rapidly than the cylinder bore as the temperature increases, the piston must be fitted loosely within the cylinder bore when the engine is cold to preclude seizure when operating temperatures are reached. The loosely fitted piston produces an objectionable noise known as "piston slap."

To reduce piston slap and to permit more arcuate sizing of the piston within the cylinder bore it has been proposed to use some form of insert that is cast into the piston to reduce or resist thermal growth. The use of the expansion controlling insert adds greatly to the cost of piston fabrication. The inserts must be accurately located in the piston mold when the piston is being cast and additional piston material must be employed to retain the insert.

It therefore is a principal object of this invention to provide an improved lightweight piston wherein the effects of thermal expansion are minimized.

It is a further object of this invention to provide an improved lightweight piston that lends itself to a simplified method of manufacture.

The high coefficiency of thermal conductivity of the lightweight metals used in piston fabrication also presents another problem. The combustion heat experienced at the head of the piston is rapidly transmitted through the piston head to the ring grooves and adjacent piston rings. As the piston rings become heated, the oil they scrape from the cylinder wall carbonizes upon the piston rings and within the ring grooves. The carbon formation reduces the sealing effectiveness of the rings. The thin piston rings also have a tendency to buckle or deflect if subjected to high temperatures.

It therefore is a still further object of this invention to provide an improved piston that insulates the piston rings from high combustion temperatures.

A piston for an internal combustion engine embodying this invention comprises a head portion having integral piston pin bosses depending from diametrically opposite sides. The head portion and integral piston pin bosses are formed from a lightweight metal having a high coefficient of thermal expansion. A strut formed from a material having a lower coefficient of thermal expansion is embedded in one of the piston pin bosses. The strut extends toward the circumference of the piston. First and second skirts formed from the same material as the head portion are affixed to the strut on opposite sides of the piston. The skirts are axially separated from the head portion.

If the material of the head portion has a high coefficient of thermal conductivity, means are provided to insulate the piston ring grooves of the head portion from combustion temperatures. The insulating means comprises a heat radiating rib depending from the head portion adjacent the piston ring groove. The outer surface of the rib may be spaced radially inwardly from the inner surface of the piston ring area to provide a heat insulating air gap therebetween.

Further objects and advantages of this invention will become more apparent when considered in conjunction with the accompanying drawings, wherein:

FIGURE 3 is a side-elevational view of one of the skirt supporting struts of the piston shown in FIGURE 1.

FIGURE 4 is a top plan view of the strut shown in FIGURE 3.

FIGURE 5 is a cross-sectional view taken through one of the piston pin bosses of the piston shown in FIGURE 1.

FIGURE 6 is a cross-sectional view taken along the line 6—6 of FIGURE 5.

Figure 1:
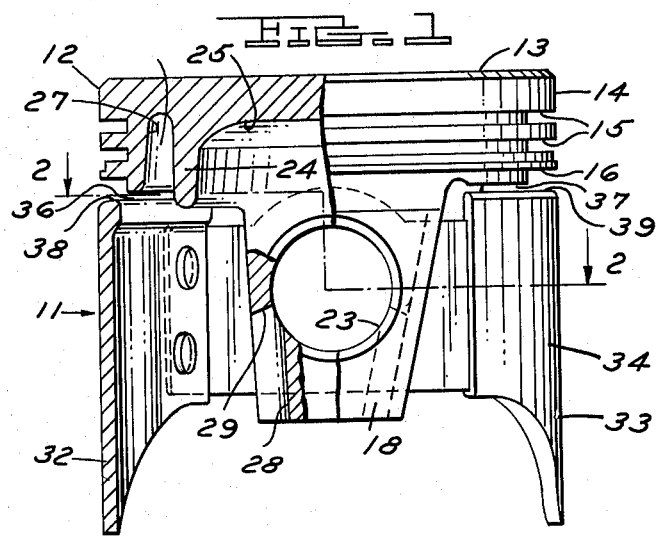
FIGURE 1 is a side-elevational view, with portions broken away, of a lightweight piston embodying this invention.

Referring now in detail to the drawings, a lightweight piston embodying this invention, indicated generally by the reference numeral 11, includes a head portion 12 having an upper surface 13 surrounded by a substantially cylindrical piston ring belt area 14. Two compression ring grooves 15 are formed around the circumference of the ring belt area 14. Compression rings of any known type (not shown) may be positioned in the compression-ring grooves 15. A relieved area 16 formed at the lower end of the piston ring belt area 14 constitutes an upper and inner surface of an oil ring groove. An oil ring of any known type (not shown) may be inserted into the oil ring groove.

A pair of integral piston pin bosses 17 and 18 depend from diametrically opposite sides of the piston-head portion 12. The piston pin bosses 17 and 18 have their outer surfaces 19 and 21 disposed radially inwardly from the circumference of the piston ring belt area 14. Aligned piston pin journals 22 and 23 are formed in the piston-pin bosses 17 and 18, respectively.

The piston head portion 12 and piston pin bosses 17 and 18 are cast from a lightweight metal having a high coefficient of thermal expansion and high coefficient of thermal conductivity. Any of the known aluminum alloys may be employed. Because of the high coefficient of thermal conductivity, the combustion heat experienced at the piston head upper surface 13 is readily transmitted through the conventional piston to the piston ring grooves and piston rings. In the illustrated piston a rib 24 depends from a lower surface 25 of the piston head portion 12 on each side of piston 11. Each rib extends circumferentially between the piston pin bosses 17 and 18 radially inwardly from the piston ring belt area 14. An arcuate air gap 26 is formed between the outer surface of each rib 24 and an opposing inner surface 27 of the piston head portion 12.

When the center of the piston head upper surface 13 is exposed to high combustion temperatures, heat will be readily transmitted across the piston head surface 13 to the ribs 24 at each side of the piston. At least part of the heat will be transferred to the ribs 24 rather than to the piston ring belt area 14. Heat will not be transmitted from the ribs 24 to the piston ring grooves 15 and 16 because of the presence of the air gaps 26. Oil that has been scraped from the cylinder wall surface by the oil ring will impinge upon the ribs 24 because they extend below the ring groove belt area 14. The oil will carry heat away from the ribs 24 to assist in the cooling action.

It heretofore has been common to drill oil holes through the piston pin bosses to lubricate the piston pin journals and piston pins. The illustrated piston 11 is provided with grooves 28 on each side of the piston pin bosses 17 and 18. The grooves 28 extend upwardly from the lower surface of the bosses 17 and 18 and have sufficient depth to intersect the piston pin journals 22 and 23 (FIGURES 1, 5 and 6). The upper end of each of the grooves 28 terminates in an inwardly sloping surface 29. During reciprocation of the piston 11, oil will impinge upon the sides of the grooves 28 and be driven upwardly toward the surface 29. The inclination of the surface 29 will assist in directing the oil to the piston pin journals 22 and 23 and to the piston pin contained therein (not shown). The grooves 28 have a draft angle so that they may be formed during the casting of the piston by appropriately forming the piston core. The outer surfaces of the piston pin bosses 17 and 18 are also formed with a draft angle and the inner surface of the head portion 12 is formed so that the piston may be cast using a single permanent core.

The inner ends of the piston pin journals 22 and 23 are chamfered as at 31. The chamfers 31 relieve the portions of the piston pin bosses 17 and 18 adjacent to the connecting rod (not shown). Side thrust of the piston or connecting rod causes a certain amount of peening of the piston pin boss in the contacting area. The peening will cause the piston pin to be locked in place in the piston pin journals 22, 23 if the chamfers 31 are not provided.

As in the conventional piston, the piston ring belt area 14 does not contact the cylinder bore surface. Cylinder wall engaging surfaces are provided, however, by slipper shaped skirts 32 and 33 positioned at diametrically opposite sides of the piston 11 below the head portion 12. The skirts 32 and 33 have substantially arcuate outer bearing surfaces 34 and 35 that extend between the bosses 17 and 18 to provide cylinder wall contacting surfaces. The upper edges of the skirts 32 and 33 are separated axially from the head portion 12 by gaps 36 and 37. The upper ends of the skirts 32 and 33 are formed with machined surfaces 38 and 39 that provide a lower surface for the oil ring groove upon which the oil ring (not shown) may rest.

In the conventional piston the skirts are integrally connected to the piston pin bosses and thus are integral with the head portion. Because of the connection to the head portion, the conventional skirts are subjected to extreme thermal expansion. The head portion of the piston expands equally in all radial directions when it is heated. The skirts, because they are primarily connected to the head portion through the piston bosses grow radially in the direction of the piston pin journals. In the direction normal to the piston pin axis, the skirts are drawn inwardly from the cylinder walls since they generally are not directly connected to the head portion in this area. Because of the unequal growth of the skirts of the normal piston, it has been conventional to cam grind the skirts so that they have their greatest dimension along the axis normal to the piston pin axis. The width decreases in the direction of the piston pin bosses. The cam ground skirts will assume more nearly the shape of a true circle when the piston is fully expanded at its operating temperature. Although cam grinding will insure a more perfect fit at operating temperatures it aggravates the piston slap problem during warm up.

In the illustrated piston 11, the skirts 32 and 33, although formed from the same material as the head portion 12, are not integral with either the head portion 12 or the piston pin bosses 17 and 18. A pair of struts, indicated generally by the reference numerals 41 and 42 and shown in greater detail in FIGURES 3 and 4, are embedded in the piston pin bosses 17 and 18, respectively, during the casting of the piston. The struts 41 and 42, only one of which will be described in detail, have a central portion 43 that extends in a direction normal to the axis of the piston pin journals 22 and 23. The central portion 43 has an enlarged bore 44 that is concentric with the piston pin journal 22. The bore 44 has a larger diameter than the journal 22, however. An arcuate portion 45 extends above the bore 44. The arcuate portion curves outwardly as seen in FIGURE 4. The central section 43 is somewhat shorter in length than the boss 17 and terminates above the lower surface of the boss 17. The central section 43 is also disposed radially outwardly of the lubricating groove 28. The central section 43 terminates at each side in inwardly offset ends 46 and 47. A plurality of vertically aligned perforations 48 are formed in each of the ends 46 and 47. The perforations may be punched from the inner surface outwardly so that an upset section 49 surrounds each perforation.

Figure 2:
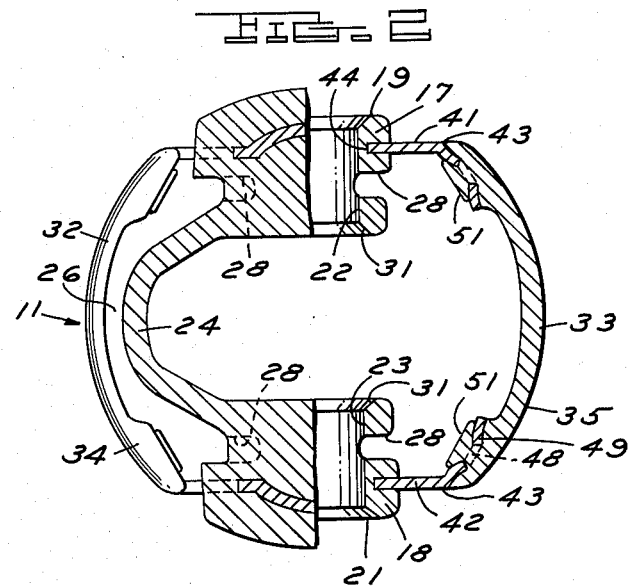
FIGURE 2 is a cross-sectional view taken along the line 2—2 of FIGURE 1.

During the casting of the piston the struts 41 and 42 are fixed in the mold and the molten metal that forms the skirts 32 and 33 may flow through the perforations 48 to form buttons 51 on the inner surface of each strut 43 (FIGURE 2). The buttons 51 lock the skirts 32 and 33 onto each side of the struts 43 with a minimum of material.

It should be readily apparent that when the piston 11 is operating within the engine, the piston head 12 will be heated. The heated piston head 12 grows equally in all radial directions. The full radial expansion of the head portion 12 will not be transmitted to the skirts 32 and 33, however, since the skirts 32 and 33 are separated axially from the head portion 12 by gaps 36 and 37 and circumferentially from the bosses 17 and 18 by the struts 41 and 42. Since the struts 41 and 42 are formed from steel or some other metal having a low coefficient of thermal expansion, the skirts 32 and 33 will not be subjected to as great a thermal expansion as the head portion 12.

It is to be understood that this invention is not limited to the exact construction shown and described but various changes and modifications may be made without departing from the scope of the invention, as defined by the appended claims.

I claim:

1. A lightweight piston for an internal combustion engine comprising a head portion having a piston ring belt area, said piston ring belt area having at least one piston ring groove formed in the outer circumference thereof, integral piston pin bosses depending from diametrically opposite sides of said head portion, said head portion and said piston pin bosses being formed from a lightweight metal having a high coefficient of thermal expansion, at least one strut embedded in one of said piston pin bosses and extending toward the circumference of said piston, said strut being formed from a material having a lower coefficient of thermal expansion than said head portion, first and second skirts affixed to said strut on opposite sides of said piston, said skirts being formed from a lightweight metal and having cylinder wall engaging surfaces on diametrically opposite sides of said piston, each of said skirts being axially separated from said head portion and supported at the edge thereof by said strut, and a heat radiant rib depending from the head portion contiguous to said piston ring belt area, said rib extending axially from said head portion toward the skirts and being radially inwardly disposed therefrom, the outer surface of said rib being spaced radially inwardly from the inner surface of the piston ring belt area to provide a heat insulating air gap therebetween.

2. A lightweight piston for an internal combustion engine comprising a head portion having a piston ring belt area, integral piston pin bosses depending from diametrically opposite sides of said head portion, said piston pin bosses being spaced radially inwardly from the outer circumference of said piston ring belt area, said head portion and said piston pin bosses being formed from a lightweight metal having a high coefficient of thermal expansion, a first strut embedded in one of said piston pin bosses, a second strut embedded in the other of said piston pin bosses, said struts being formed from a material having a lower coefficient of thermal expansion than said head portion, said struts having perforations in the outer ends thereof, first and second skirts formed from a lightweight metal, each of said skirts extending circumferentially around a respective side of said piston to provide a cylinder wall engaging surface, each of said skirts being affixed at one side to one end of said first strut and at the other side to one end of said second strut by portions that extend through the perforations in said struts.

3. A lightweight piston for an internal combustion engine comprising a head portion having a piston ring belt area, said piston ring belt area having at least one piston ring groove formed in the outer circumference thereof, a pair of integral piston pin bosses depending from said head portion on diametrically opposite sides thereof, said head portion and said piston pin bosses being formed from a lightweight metal having a high coefficient of thermal expansion, aligned piston pin journals formed in said piston pin bosses, a first strut embed in one of said piston pin bosses, a second strut embedded in the other of said piston pin bosses, each of said struts being formed from a metal having a lower coefficient of thermal expansion than said head portion, said struts extending in planes substantially normal to the axis of said piston pin journals, the outer ends of each of said struts having an offset portion provided with vertically spaced perforations, and skirts formed from a lightweight metal and having cylinder wall engaging surfaces on diametrically opposite sides of said piston, each of said skirts being axially separated from said head portion and supported at each edge thereof by said struts, said skirts having portions thereof extending through the perforations in said struts to provide a rigid assembly, and a heat radiant rib depending from the head portion contiguous to said piston ring belt area, said rib extending axially from said head portion toward the skirts and being radially inwardly disposed therefrom, the outer surface of the rib being spaced radially inwardly from the inner surface of the piston ring belt area to provide a heat insulating air gap therebetween.

4. A piston for an internal combustion engine having a head portion, piston pin bosses depending from said head portion on diametrically opposite sides thereof, and skirts having cylinder wall engaging surfaces extending circumferentially of said piston between said piston pin bosses, said head portion comprising an upper surface surrounded by a depending piston ring belt area, at least one piston ring groove formed in the outer circumference of said piston ring belt area, a heat radiating rib depending toward said skirts from said upper surface adjacent said piston ring belt area, the outer surface of said rib being spaced radially inwardly from the inner surface of said piston ring belt area to provide a heat insulating air gap therebetween.

5. A lightweight piston for an internal combustion engine comprising a head portion having a piston ring belt area, a pair of integral piston pin bosses depending from said head portion on diametrically opposite sides thereof, said piston pin bosses being spaced radially inwardly from the outer circumference of said head portion, said head portion and said piston pin bosses being formed from a lightweight metal having a high coefficient of thermal expansion, aligned piston pin journals formed in said piston pin bosses, a first strut embedded in one of said piston pin bosses, a second strut embedded in the other of said piston pin bosses, said struts extending in planes substantially normal to the axis of said piston pin journals, each of said struts being formed from a metal having a lower coefficient of thermal expansion than said head portion, said struts terminating in an axial direction adjacent the lower end of said piston pin bosses, a first skirt affixed at one side to one edge of said first strut and at the other side to one edge of said second strut and extending therebetween to form a cylinder wall engaging surface, and a second skirt affixed at one end to the other edge of said first strut and at the other end to the other edge of said second strut and extending therebetween to form a cylinder wall engaging surface, each of said skirts having substantially the same length at their point of attachment to said struts as said struts and increasing in length toward the diameter of said piston normal to the axis of said piston pin journals.

6. A lightweight piston as defined by claim 5 wherein at least one piston ring groove is formed in the outer circumference of the piston ring belt area and a heat radiant rib depends from the head portion contiguous to said piston ring belt area, said rib extending axially from said head portion toward the skirts and being radially inwardly disposed therefrom.

7. A lightweight piston as defined by claim 6 wherein the outer surface of the rib is spaced radially inwardly from the inner surface of the piston ring belt area to provide a heat insulating air gap therebetween.

8. A lightweight piston as defined by claim 7 wherein at least one groove is formed in the wide of each of the piston pin bosses, said groove extending from the lower end of said piston pin bosses upwardly toward the piston head portion, said groove having sufficient depth to intersect the piston pin journal for oil flow through said groove to said piston pin journal.

References Cited by the Examiner
UNITED STATES PATENTS

| | | | |
|---|---|---|---|
| 1,681,709 | 8/1928 | Nelson | 92—230 |
| 2,141,784 | 12/1938 | Day | 92—228 |
| 2,801,890 | 8/1957 | Nitsch | 92—230 |
| 3,179,021 | 4/1965 | Holcombe | 92—158 |

EDGAR W. GEOGHEGAN, *Primary Examiner.*

KARL J. ALBRECHT, *Examiner.*